(12) United States Patent
Sandberg

(10) Patent No.: US 6,968,183 B2
(45) Date of Patent: Nov. 22, 2005

(54) DETERMINING A MULTI-MODULE DEPENDENT PARAMETER AT A TELECOMMUNICATION NODE

(75) Inventor: Kenneth Sandberg, Ekerö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 635 days.

(21) Appl. No.: 09/985,326

(22) Filed: Nov. 2, 2001

(65) Prior Publication Data

US 2003/0088867 A1  May 8, 2003

(51) Int. Cl.$^7$ .......................... H04M 11/42; G06F 9/44
(52) U.S. Cl. ...................... 455/418; 717/170; 717/171
(58) Field of Search ................................. 455/418–420, 455/561, 560; 717/100, 168, 169, 170, 173, 717/171, 178, 176; 713/1; 379/219; 700/9, 700/19, 86; 709/221

(56) References Cited

U.S. PATENT DOCUMENTS

| | | | |
|---|---|---|---|
| 4,558,413 A | | 12/1985 | Schmidt et al. |
| 5,247,683 A | * | 9/1993 | Holmes et al. ............. 709/221 |
| 5,434,798 A | * | 7/1995 | Madebrink et al. ......... 709/221 |
| 5,436,955 A | | 7/1995 | Kaewell, Jr. et al. |
| 5,577,232 A | | 11/1996 | Priem et al. |
| 5,579,509 A | | 11/1996 | Furtney et al. |
| 5,603,027 A | | 2/1997 | Ohkami |
| 5,649,204 A | | 7/1997 | Pickett |
| 5,675,748 A | * | 10/1997 | Ross ........................... 710/104 |
| 5,805,889 A | | 9/1998 | Van De Vanter |
| 5,881,292 A | | 3/1999 | Sigal et al. |
| 5,896,527 A | | 4/1999 | Ceruti et al. |
| 6,041,228 A | | 3/2000 | Niska et al. |
| 6,182,286 B1 | | 1/2001 | Sigal et al. |
| 6,185,437 B1 | | 2/2001 | Bark |
| 6,202,207 B1 | | 3/2001 | Donohue |
| 6,216,137 B1 | | 4/2001 | Nguyen et al. |
| 6,240,550 B1 | * | 5/2001 | Nathan et al. ............... 717/169 |
| 6,418,555 B2 | * | 7/2002 | Mohammed ................ 717/169 |

(Continued)

FOREIGN PATENT DOCUMENTS

EP        0 948 227 A        10/1999

(Continued)

Primary Examiner—Charles N. Appiah
(74) Attorney, Agent, or Firm—Nixon & Vanderhye, P.C.

(57) ABSTRACT

Facile changing and updating of a first module (101) of a platform (100) is achieved despite the fact that a parameter required for execution of the first module depends both upon which version of the first module (101) and which version of a second module (102) is included in the platform. Reconfiguration of the platform occasioned by the changing and/or updating of the first module is facilitated by having both the first module and a second module maintain respective pre-revision parameter arrays (111, 112) for the multi-module dependent parameter. The pre-revision parameter arrays comprises sets of parameter candidate values for plural combinations of versions of the first module and versions of the second module. When one of the first module and the second module is to become a revised module by replacement with a new version (e.g., the new version of the revised module), a revised parameter array (111') is also provided for the revised module. After reconfiguration, one of the parameter candidate values in the third set of parameter candidate values is selected as qualifying as an appropriate parameter value for use in conjunction with the modules of the platform. In an example implementation, one of the first module and the second module can be a hardware module while the other of the first module and the second module is a software module. Moreover, one example environment of implementation is a telecommunications platform, such as (for example) a node of a radio access network (RAN).

26 Claims, 9 Drawing Sheets

U.S. PATENT DOCUMENTS

| | | | |
|---|---|---|---|
| 6,453,468 B1 * | 9/2002 | D'Souza | 717/168 |
| 6,493,594 B1 * | 12/2002 | Kraml | 700/19 |
| 6,637,023 B1 * | 10/2003 | Ginsberg | 717/122 |
| 6,671,809 B1 * | 12/2003 | Perona et al. | 713/200 |
| 6,795,965 B1 * | 9/2004 | Yadav | 717/168 |

FOREIGN PATENT DOCUMENTS

| | | |
|---|---|---|
| EP | 1 093 319 A1 | 4/2001 |
| JP | 60-252952 A | 12/1985 |

\* cited by examiner

EXAMPLE PLATFORM RECONFIGURATION TECHNIQUE

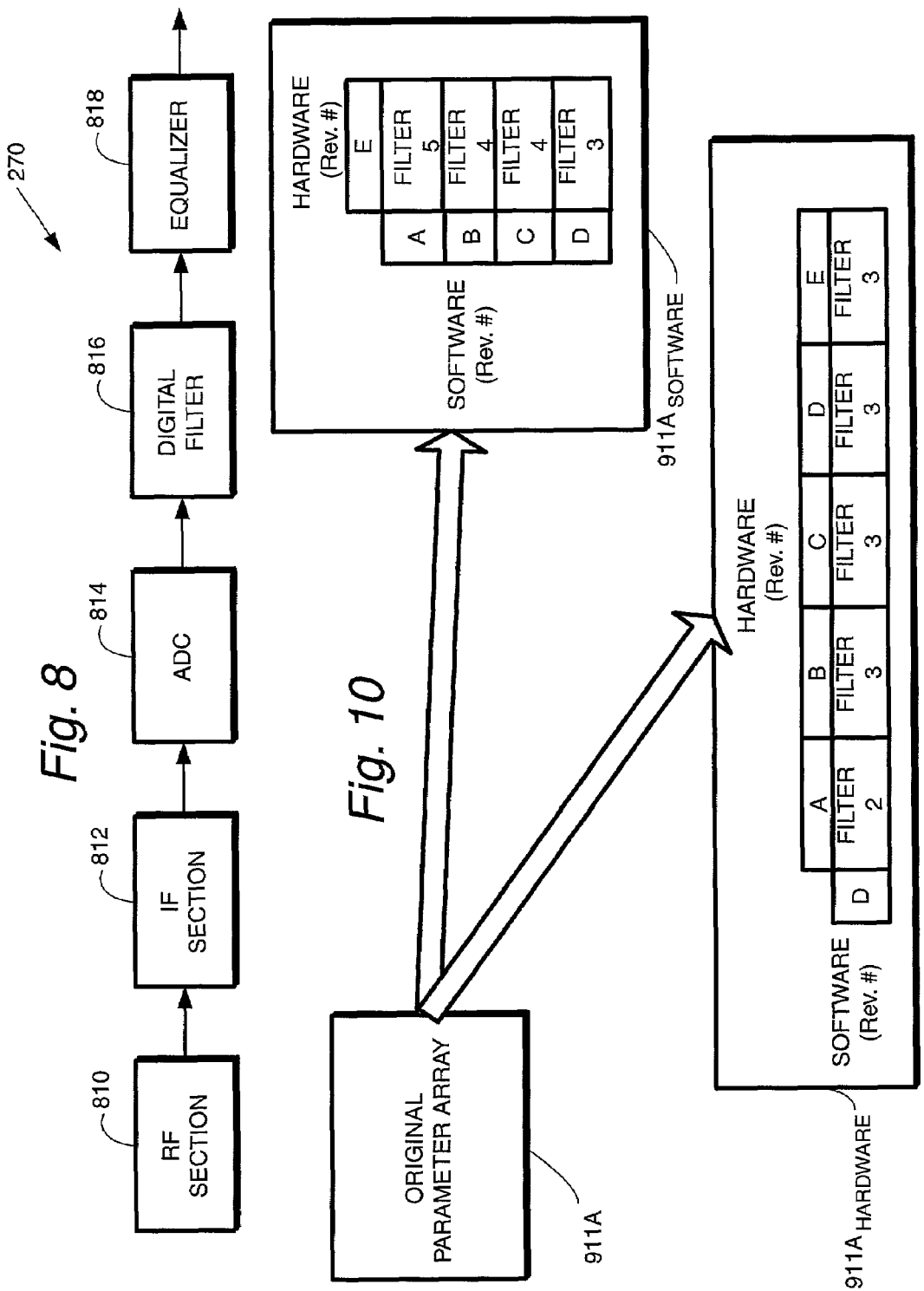

| SOFTWARE (Rev. #) | HARDWARE (Rev. #) | | | | |
|---|---|---|---|---|---|
| | | A | B | C | D | E |
| | A | FILTER 1 | FILTER 1 | FILTER 1 | FILTER 1 | FILTER 5 |
| | B | FILTER 2 | FILTER 2 | FILTER 4 | FILTER 4 | FILTER 4 |
| | C | FILTER 2 | FILTER 3 | FILTER 3 | FILTER 4 | FILTER 4 |
| | D | FILTER 2 | FILTER 3 | FILTER 3 | FILTER 3 | FILTER 3 |

| SOFTWARE (Rev. #) | HARDWARE (Rev. #) | | | | |
|---|---|---|---|---|---|
| | | A | B | C | D | E |
| | A | FILTER SETTING 1 | FILTER SETTING 1 | FILTER SETTING 1 | FILTER SETTING 1 | FILTER SETTING 5 |
| | B | FILTER SETTING 2 | FILTER SETTING 2 | FILTER SETTING 4 | FILTER SETTING 4 | FILTER SETTING 4 |
| | C | FILTER SETTING 2 | FILTER SETTING 3 | FILTER SETTING 3 | FILTER SETTING 4 | FILTER SETTING 4 |
| | D | FILTER SETTING 2 | FILTER SETTING 3 | FILTER SETTING 3 | FILTER SETTING 3 | FILTER SETTING 3 |

DETERMINING A MULTI-MODULE DEPENDENT PARAMETER AT A TELECOMMUNICATION NODE

BACKGROUND

1. Field of the Invention

The present invention pertains to method and apparatus for determining what parameter value is to be utilized by plural revisable modules comprising a platform, particularly a telecommunications platform.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The radio base station and radio network controller generally described above are examples of nodes or platforms of a telecommunications system which can employ several modules. Typically such nodes or platforms have both software and hardware modules, and a fairly complex relationship can exist between the modules.

In view of their complexity there can be one or more dependencies between the differing modules. As one example of complexity, for its execution a software module may require a certain calibration parameter, with the value of that calibration parameter depending upon a type or identity (e.g., version) of a particular hardware module utilized at the node or platform. As another example, interfacing of a first software module with a second software module may entail usage of parameter similarly having a value dependent on the type or identity of one or more of the communicating software modules.

One prior art technique for handling parameter whose value depends on an identity of a module is to store such parameter in a database at one module of a platform. For example, such a database (storing, e.g., a definitive value for a particular hardware-influenced parameter) may be situated at or belong to a hardware module (stored, e.g., in a local memory in the hardware), and be accessible by a software module that utilizes that particular parameter. If the hardware module is changed (e.g., upgraded or replaced), the corresponding definitive parameter can be easily accessed from the database of the new hardware module (the parameter value may change as a result of the module change) and, in many instances, also be utilized by the unchanged software module.

A more complex situation occurs when the choice of a value for the parameter depends not just on the identity of one module which utilizes the parameter (e.g., the hardware module in the scenario of the previous paragraph), but also the identity of other modules which utilize the parameter (e.g., the software module in the scenario of the previous paragraph). In other words, the determination of the value for the parameter depends upon the combination of identities of two otherwise independently upgradable/revisable modules. In this complex situation, if the database is stored at the hardware module, release of a new version of the software module is problematic. Conversely, if the database is stored at the software module, the definitive parameter value stored in the database may not be compatible with a new version of a hardware module.

What is needed, therefore, and an object of the present invention, is a technique which facilitates upgrading or changing of a module of a platform or node when the identities of a combination (e.g., plural) of modules of the node influence determination of a parameter utilized by the combination of the modules.

BRIEF SUMMARY

Facile changing and updating of a first module of a platform (such as a telecommunications platform, for example) is achieved despite the fact that a parameter required for execution of the first module depends both upon which version of the first module and which version of a second module is included in the platform. Reconfiguration of the platform occasioned by the changing and/or updating of the first module is facilitated by having both the first module and a second module maintain respective pre-revision parameter arrays for the multi-module dependent parameter. The pre-revision parameter array for the first module comprises a first set of parameter candidate values for plural combinations of versions of the first module and versions of the second module. Likewise, the pre-revision parameter array for the second module comprises a second set of parameter candidate values for plural combinations of versions of the first module and versions of the second module. Prior to the platform reconfiguration, an appropriate parameter value for use in conjunction with execution of at least one of the first module and the second module is determined from one of the first set of parameter candidate values and the second set of parameter values. When one of the first module and the second module is to become a revised module by replacement with a new version (e.g., the new version of the revised module), a revised parameter array is also provided for (preferably included with) the revised module. The revised parameter array comprises a third set of parameter candidate values for plural version combinations of the first module and the second module. After reconfiguration, one of the parameter candidate values in the third set of parameter candidate values is selected as qualifying as an appropriate parameter value for use in conjunction with the modules of the platform.

The revised parameter array is preferably included in the new version of the first module, and can take the example form of a matrix having a first dimension and a second dimension. The first dimension of such a matrix is conceptualized as having one or more rows and the second dimension is conceptualized as having one or more columns, there being at least two rows or two columns, with one of the first dimension and the second dimension corresponding to one or more versions of the first module and another of the first dimension and the second dimension corresponding to one or more versions of the second module. Each matrix position formed at the intersection of a column and row has a corresponding parameter candidate value.

In an example implementation, one of the first module and the second module can be a hardware module while the other of the first module and the second module is a software module. Moreover, one example environment of implementation is a telecommunications platform, such as (for example) a node of a radio access network (RAN). For example, the RAN node can be a base station node. An example multi-module dependent parameter utilized in a radio base station node is a filter parameter, e.g., a filter parameter which either: (1) identifies which of plural filters are to be utilized; or (2) includes numbers to be utilized with or by a particular filter.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8 is a schematic view of a receiver of an example radio base station which serves as an example context for implementation of the present invention.

FIG. 9A is a diagrammatic view of a parameter array or matrix for a filter parameter which identifies which of plural filters are to be utilized.

FIG. 9B is a diagrammatic view of a parameter array or matrix for a filter parameter which includes numbers to be utilized with or by a particular filter.

FIG. 10 is a diagrammatic view showing replacement of the original parameter array of FIG. 9A with either an abbreviated revised parameter array for a hardware module or an abbreviated revised parameter array for a software module.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1A:
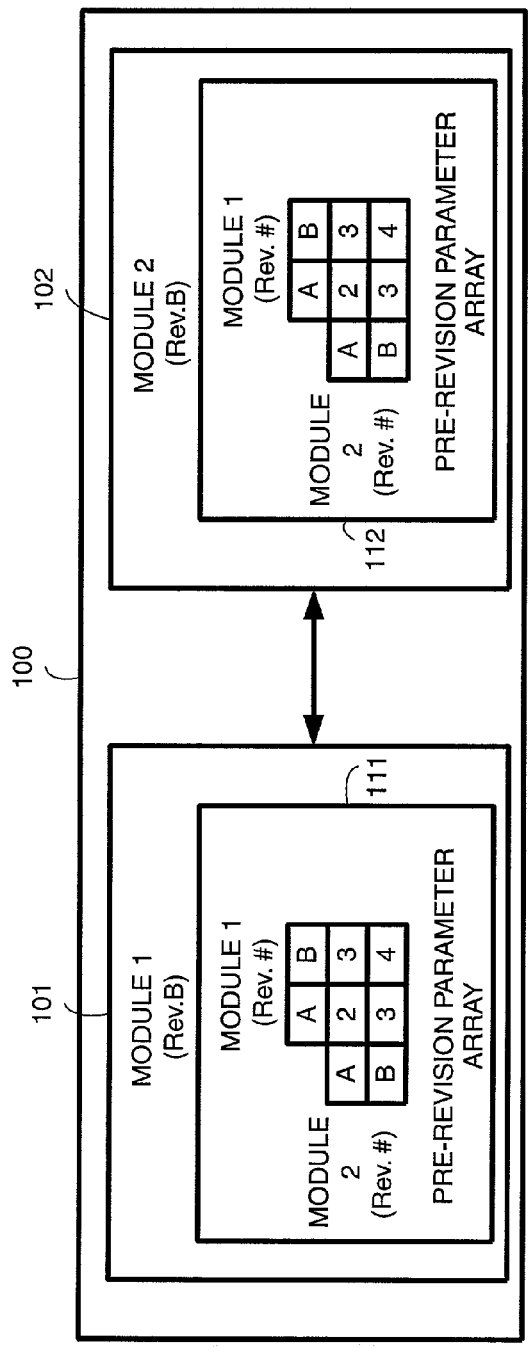
FIG. 1A is diagrammatic view of an example platform which utilizes a multi-module dependent parameter, prior to reconfiguration of the platform.

FIG. 1A illustrates an example multi-module platform 100 which includes plural modules as represented by first module 101 and second module 102. As explained subsequently by way of example, platform 100 may host hardware modules, software modules, or a combination of hardware modules and software modules. For example, first module 101 may be a hardware module, while second module 102 may be a software module.

As utilized herein, the term "module" includes but is not limited to any one or more of the following, either alone or in combination: (1) a unit of executable instructions or code (e.g., software), with or without data utilized in conjunction with execution of such instructions; (2) a unit (e.g., processor) which executes (1); (3) a circuit board having one or more devices (e.g., processor or state machine) or circuits (e.g., logic circuit); (4) a device (either discrete or integrated with another device) which interacts with another device.

It is contemplated that the modules of platform 100 are subject to revision, and therefore that there are or potentially could be plural versions of each of first module 101 and second module 102. For example, there may be a first version (version A) for first module 101, a second version (version B) for first module 101, and so forth. Similarly, second module 102 may have plural versions.

In one of its aspects, the present invention particularly concerns a situation in which a parameter required for execution of platform 100 depends both upon which version of the first module and which version of a second module is included in the platform. Such a parameter is termed herein a "multi-module dependent parameter." The parameter may be required for execution of one of the first module 101 or second module 102, or required by for execution of both first module 101 and second module 102. In any event, what value is to be employed or chosen for the multi-module dependent parameter depends on the version numbers of both the first module 101 and the second module 102, as hereinafter illustrated.

Heretofore the presence of such a multi-module dependent parameter has ordinarily complicated changing or updating of a module of a platform. However, in accordance with the present invention, facile changing and updating of a module (such as first module 101) of a platform (such as a telecommunications platform, for example) is achieved despite the fact that such change or upgrade potentially affects the value of a multi-module dependent parameter utilized in conjunction with execution of one or more modules of the platform.

It should be understood that the number of modules present at platform 100 is not limited to two, and that likely a greater number of modules may reside at platform 100. Moreover, while in the illustration of FIG. 1A and FIG. 1B the multi-module dependent parameter depends on the versions of two modules (e.g., first module 101 and second module 102), such a multi-module dependent parameter can be dependent upon a greater number of modules.

Figure 1B:
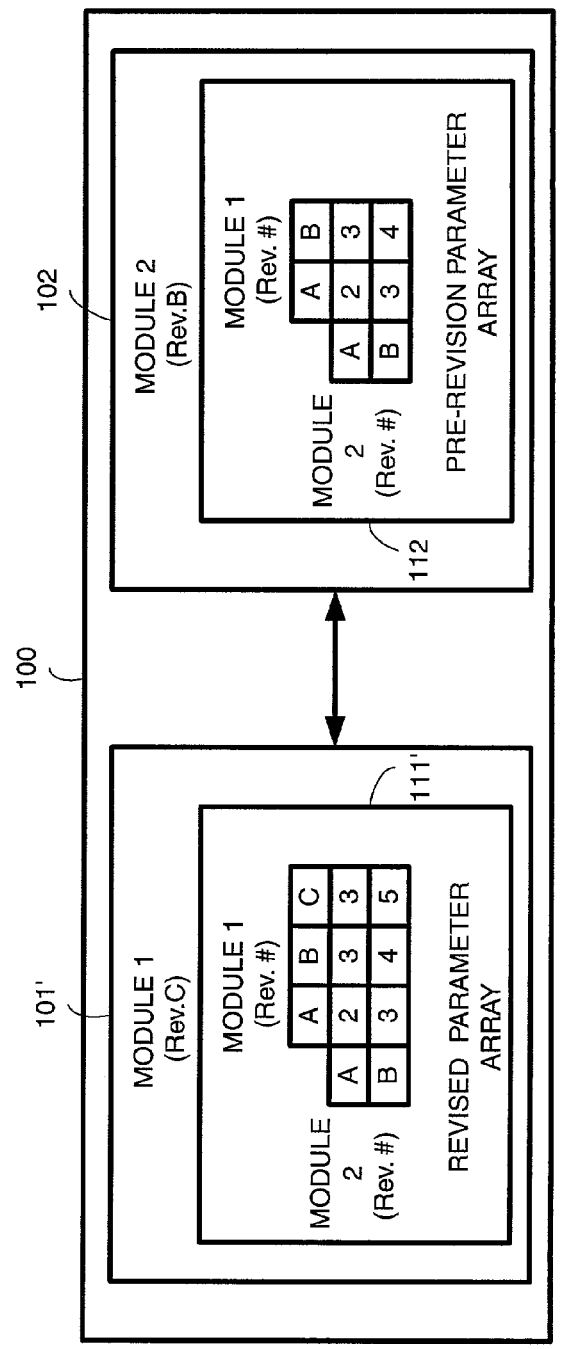
FIG. 1B is diagrammatic view of the example platform of FIG. 1A after reconfiguration of the platform.
Figure 2:
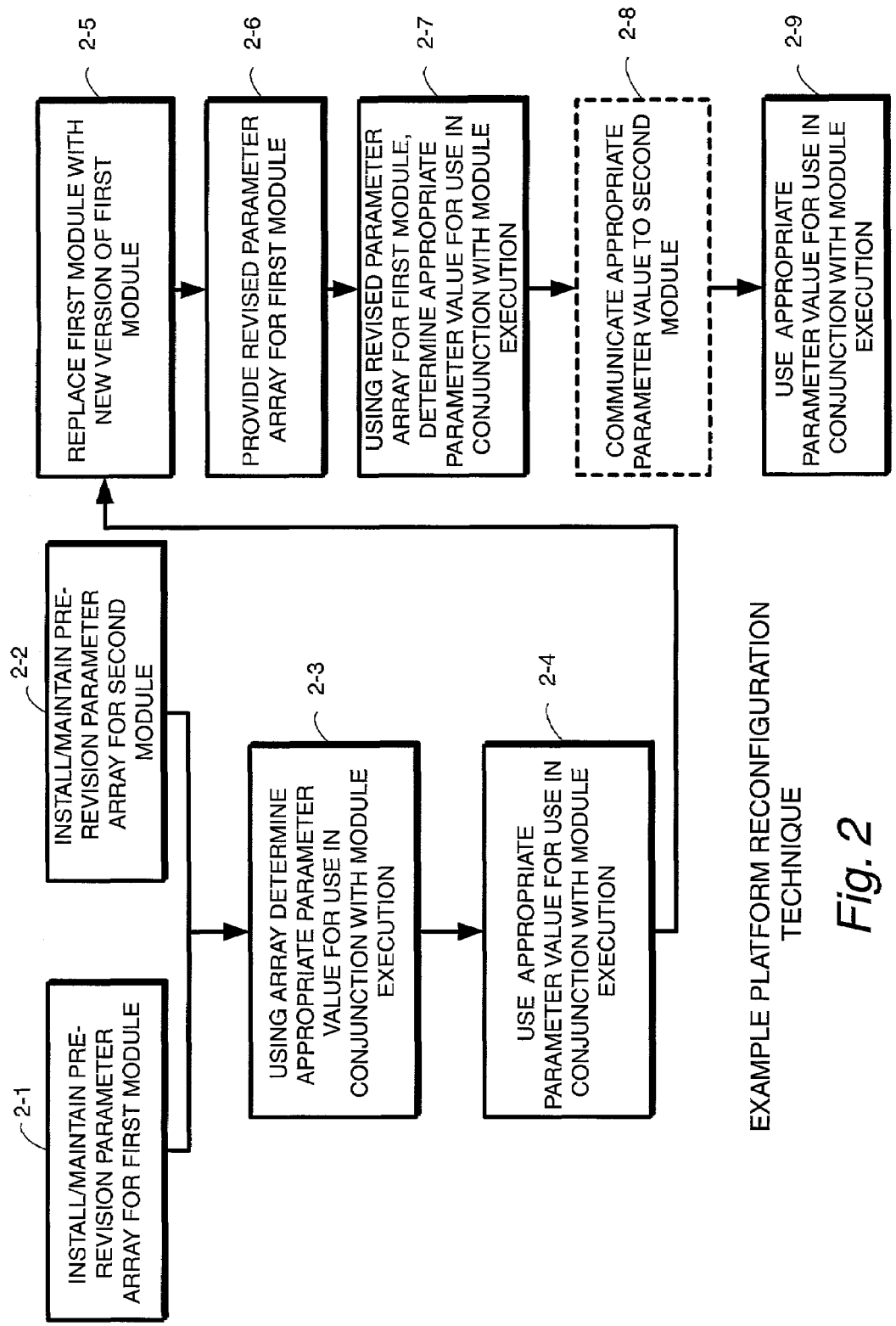
FIG. 2 is a flowchart showing certain basic example steps performed in conjunction with a platform reconfiguration technique according to an example mode of the invention.

FIG. 2 illustrates certain basic example steps and or actions performed in conjunction with reconfiguration of a platform such as platform 100. In the example scenario now discussed, platform 100 is reconfiguration from the situation shown in FIG. 1A to that shown in FIG. 1B.

In the present invention, reconfiguration of the platform occasioned by the changing and/or updating of a module (which executes utilizing such a multi-module dependent parameter) is facilitated, e.g., by having plural modules which affect the multi-module dependent parameter maintain respective pre-revision parameter arrays for the multi-module dependent parameter. For example, in platform 100 of FIG. 1A, both the first module 101 and a second module 102 maintain respective pre-revision parameter arrays 111, 112 for the multi-module dependent parameter.

Thus, as shown by step 2-1 in FIG. 2, the pre-revision parameter array 111 for the first module 101 is installed and/or subsequently maintained to comprise a first set of parameter candidate values for plural combinations of versions of the first module and versions of the second module. Likewise, as depicted by step 2-2, the pre-revision parameter array 112 for the second module 102 comprises a second set of parameter candidate values for plural combinations of versions of the first module and versions of the second module.

The pre-revision parameter arrays 111, 112 can, in an illustrated implementation, take the form of a matrix. In the situation in which the multi-module dependent parameter has a value dependent upon the versions of two modules, the matrix is a two dimensional matrix. Should the multi-module dependent parameter have a value dependent upon the versions of n number of modules, the matrix would be a n-dimensioned matrix. For the two dimensional matrices 111, 112 illustrated in FIG. 1A, the first dimension of each matrix is conceptualized as having one or more (horizontal) rows while the second dimension is conceptualized as having one or more (vertical) columns. As illustrated in FIG. 1A, both matrices 111 and 112 have two rows and two columns, a first column being associated with version A of first module 101 and a second column being associated with version B of first module 101; a first row of each matrix being associated with version A of second module 102 and a second row of being associated with version B of second module 102. At the intersection of each row/column, at each matrix position, a corresponding parameter candidate value for the parameter is stored.

As exemplified by step 2-3, prior to the platform reconfiguration an appropriate parameter value for use in conjunction with execution of at least one of the first module and the second module is determined from one of the first set of parameter candidate values (in array 111) and the second set of parameter values (in array 112). It just so happens in the scenario of FIG. 1A that array 111 and array 112 are identical and thus have the same values. However, as understood subsequently, such need not be the case (and in the event of reconfiguration will later not be the case). Thus, one of the parameter candidate values is chosen as the appropriate parameter value from an appropriate one of the matrices 111, 112 for use in conjunction with execution of platform 100 depending upon which version of first module 101 and which version of second module 102 are being utilized (e.g., depending upon the particular combination of versions of first module 101 and second module 102 are utilized). For the situation shown in FIG. 1A, which utilizes revision B of first module 101 and revision B of second module 102, the intersection of the second row and second column of the matrix of parameter array 111 yields the value "4" as the appropriate parameter value for use at this pre-configuration point in time.

Step 2-4 of FIG. 2 shows the execution at the platform (e.g., execution of one or both of first module 101 and second module 102) using the appropriate parameter value.

Step 2-5 of FIG. 2 and FIG. 1B collectively depict replacement or revision of at least part of one of the first module 101 and second module 102, resulting in a revised module. For sake of discussion, it is presumed that first module 101 is replaced with a new version of first module 101 (e.g., version or revision C of first module 101), whereupon first module 101 becomes the revised module 101'. In conjunction with the module replacement (and thus the reconfiguring of platform 100), as step 2-6 a revised parameter array is also provided for the revised module. The revised parameter array is illustrated in FIG. 1B as being revised parameter array 111'.

The revised parameter array 111' as shown in FIG. 1B comprises a third set of parameter candidate values for plural version combinations of the first module and the second module. In particular, the third set of parameter candidate values in revised parameter array 111' includes a new row for revision C of first module 101. In accordance with revised parameter array 111', the parameter candidate value of "3" is to be used as the appropriate parameter value when revision (version) C of first module 101 is utilized and revision A of second module 102 is utilized. On the other hand, the parameter candidate value of "5" is to be used as the appropriate parameter value when revision (version) C of first module 101 is utilized and revision B of second module 102 is utilized.

After reconfiguration, and as depicted by step 2-7, one of the parameter candidate values in the third set of parameter candidate values is selected as qualifying as an appropriate parameter value for use in conjunction with the modules of the platform, as understood from the preceding paragraph. For the situation shown in FIG. 1B, which utilizes revision C of first module 101 and revision B of second module 102, the intersection of the second row and third column of the matrix of revised parameter array 111' yields the value "5" as the appropriate parameter value for use at this post-configuration point in time.

When required, the appropriate parameter value may be communicated from the revised module to another module of platform 100. For example, in the illustrated example scenario of FIG. 1B wherein the first module 101 is the revised module, the appropriate parameter value selected from the parameter candidate values of revised parameter array 111' can be transmitted to second module 102 for, e.g., use by second module 102 should execution of second module 102 require the parameter. In view of the optional nature of step 2-8, step 2-8 is framed by broken lines in FIG. 2. The optional nature of step 2-8 occurs, for example, in a scenario in which the value of the multi-module dependent parameter is required for execution by only one module of the platform 100, e.g., first module 101 of platform 100 but not second module 102. Step 2-8 illustrates the situation in which the value of multi-module dependent parameter is also need as input or otherwise for execution of second module 102. Step 2-9 of FIG. 2 represents execution of a module of platform 100 (e.g., first module 101, second module 102, or both first module 101 and second module 102) using the multi-module dependent parameter (as selected from revised parameter array 111').

In conjunction with optional step 2-8, it should be understood that the value of the multi-module dependent parameter can be communicated to another module (such as second module 102) either by transmitting the value of the multi-module dependent parameter itself to the other module, or by other techniques. One such other technique is to transmit the revised parameter array 111' to the other module (e.g., to second module 102), along with the revision (version) number of first module 101. Such transmission can occur using a variety of techniques, such as passage of a software argument, transmission of digital other types of signals, etc. The nature of the transmission depends on various factors, such as the relative situating of the modules (e.g., on the same board or not, the types of inputs/outputs, etc.).

The revised parameter array, such as revised parameter array 111', can also take the form of a matrix as shown in FIG. 1B and as explained previously.

In an example implementation, one of the first module and the second module can be a hardware module while the other of the first module and the second module is a software module. For example, first module 101 can be a hardware module, while second module 102 can be a software module.

Figure 3:
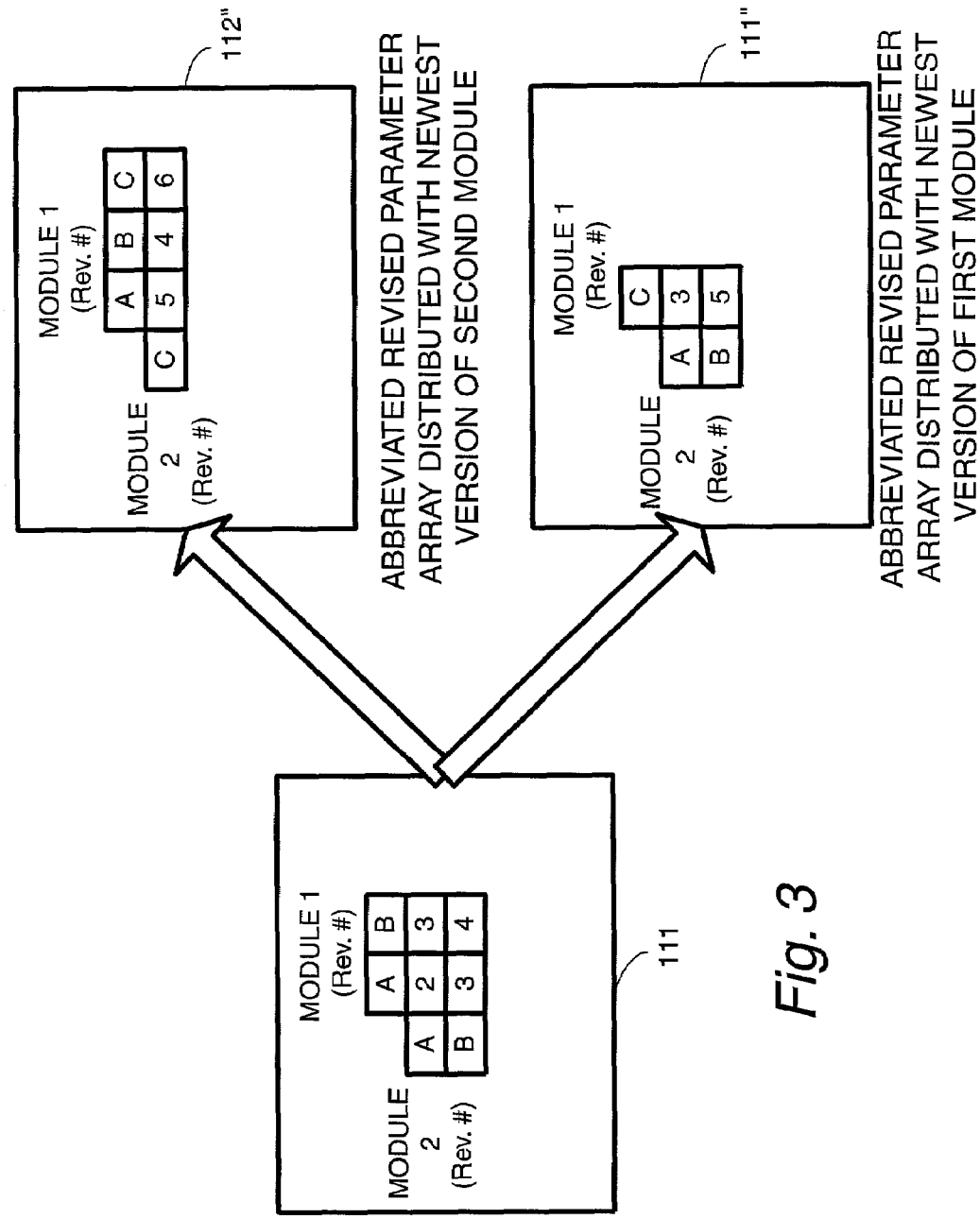
FIG. 3 is a diagrammatic view showing replacement of an original parameter array with either an abbreviated revised parameter array for a first module or an abbreviated revised parameter array for a second module.

The revised parameter array 111' illustrated in FIG. 1B happens to account for all possible combinations of two different modules, e.g., first module 101 and second module 102. It will be appreciated, however, that when a revised parameter array is distributed together with a module in the reconfiguration process, the revised parameter array really need only have one row or one column. Such one row or one column is associated with the version of the module with which the revised parameter array is distributed, it being realized that previous versions of the module which accompanies the revised parameter array are likely superfluous. In this regard, FIG. 3 shows the original matrix or array of FIG. 1, as well as two possible abbreviated revised parameter arrays. For example, FIG. 3 shows a revised parameter array 111" which can be distributed along with revision C of first module 101, as well as a revised parameter array 112" which can be distributed along with revision C of second module 102. Consistent with the foregoing considerations, revised parameter array 111" requires only one row (corresponding to the right most row of revised parameter array 111' of FIG. 1B) to cater to the newest version of first module 101. Similarly, revised parameter array 112" requires only one column to cater to the newest version of second module 102.

From the foregoing it can be seen that, at the time shown in FIG. 1B, the platform 100 has a new version of first module 101 (e.g., revised module 101'), second module 102, and an array of values for a parameter (revised parameter array 111'). An appropriate one of the values for the parameter in the array is required in conjunction with execution of at least one of the first module and the second module. The array includes, for each of plural potential versions of the second module (e.g., versions A and B of second module 102), a parameter candidate value for use as the appropriate parameter value. The choice of the appropriate parameter value is dependent upon a combined implementation at the platform of (1) the new version of the first module; and (2) a corresponding one of the potential versions of the second module. Again it is noted that, for the situation shown in FIG. 1B, which utilizes revision C of first module and revision B of second module 102, the intersection of the second row and third column of the matrix of revised parameter array 111' yields the value "5" as the appropriate parameter value.

Also from the foregoing it can be seen that a technique of the present invention, as described, e.g., with reference to FIG. 2, involves replacing at least a portion of an old version of the first module of the platform with a new version of the first module. For example, old version (Revision B) of first module 101 shown in FIG. 1A is replaced by revised version (Revision C) of first module 101. Moreover, along with the new version of the first module, an array of values for the parameter is also provided (e.g., revised parameter array 111' for first module 101' in FIG. 1B). An appropriate one of the values for the parameter is required in conjunction with execution of at least one of the first module 101' and the second module 102. The array includes, for each of plural potential versions of the second module (e.g., versions A and B of second module 102), a parameter candidate value for use as the appropriate parameter value. The appropriate parameter value is dependent upon a combined implementation at the platform of (1) the new version of the first module; and (2) a corresponding one of the potential versions of the second module One non-limiting, example context or environment of implementation of the present invention is a telecommunications platform, such as (for example) a node of a radio access network (RAN) like that shown in FIG. 4. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Figure 4:
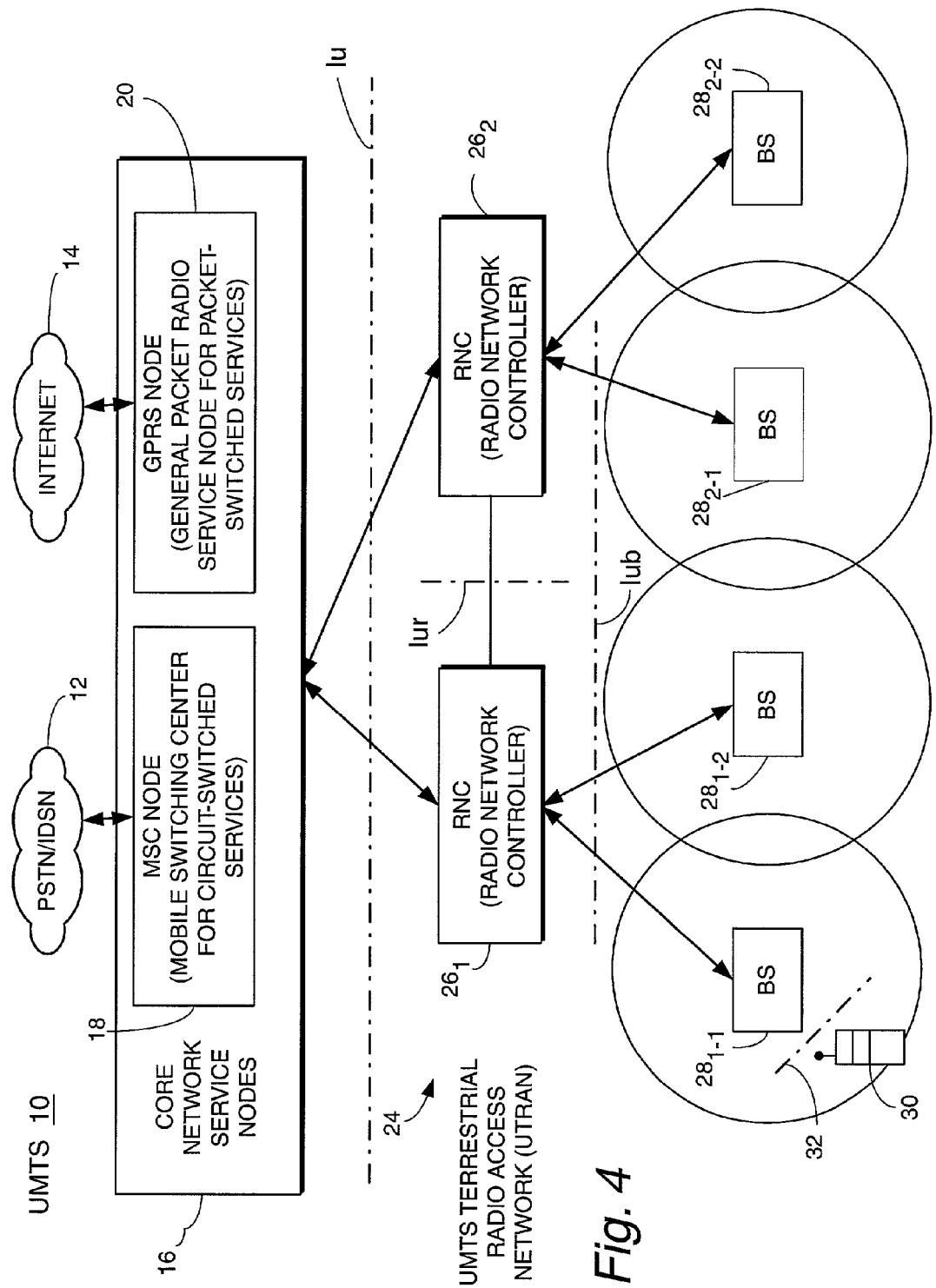
FIG. 4 is diagrammatic view of example mobile communications system in which the present invention may be advantageously employed.

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 4 is shown with only two RNC nodes, particularly RNC $26_1$, and RNC$26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $282_{2-1}$ and base station $28_{2-2}$. It will be appreciated that a different number of base stations can be served by each RNC, and that RNCs need not serve the same number of base stations. Moreover, FIG. 4 shows that an RNC can be connected over an Iur interface to one or more other RNCs in the URAN 24. Further, those skilled in the art will also appreciate that a base station is sometimes also referred to in the art as a radio base station, a node B, or B-node.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 4, communicates with one or more cells or one or more base stations (BS) 28 over a radio or air interface 32. Each of the radio interface 32, the Iu interface, the Iub interface, and the Iur interface are shown by dash-dotted lines in FIG. 4.

Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

In cell_DCH state, each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of channels may exist between one of the base stations 28 and user equipment units (UEs) 30 for transport of control and user data. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). The forward access channel (FACH) is also used to carry user data. In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Dedicated channels (DCH) may be allocated to carry substantive call communications with a user equipment unit (UE).

As set up by the control channels, traffic channels (TCH) are allocated to carry substantive call communications with a user equipment unit (UE). Some of the traffic channels can be common traffic channels, while others of the traffic channels can be dedicated traffic channels (DCHs).

Figure 5:
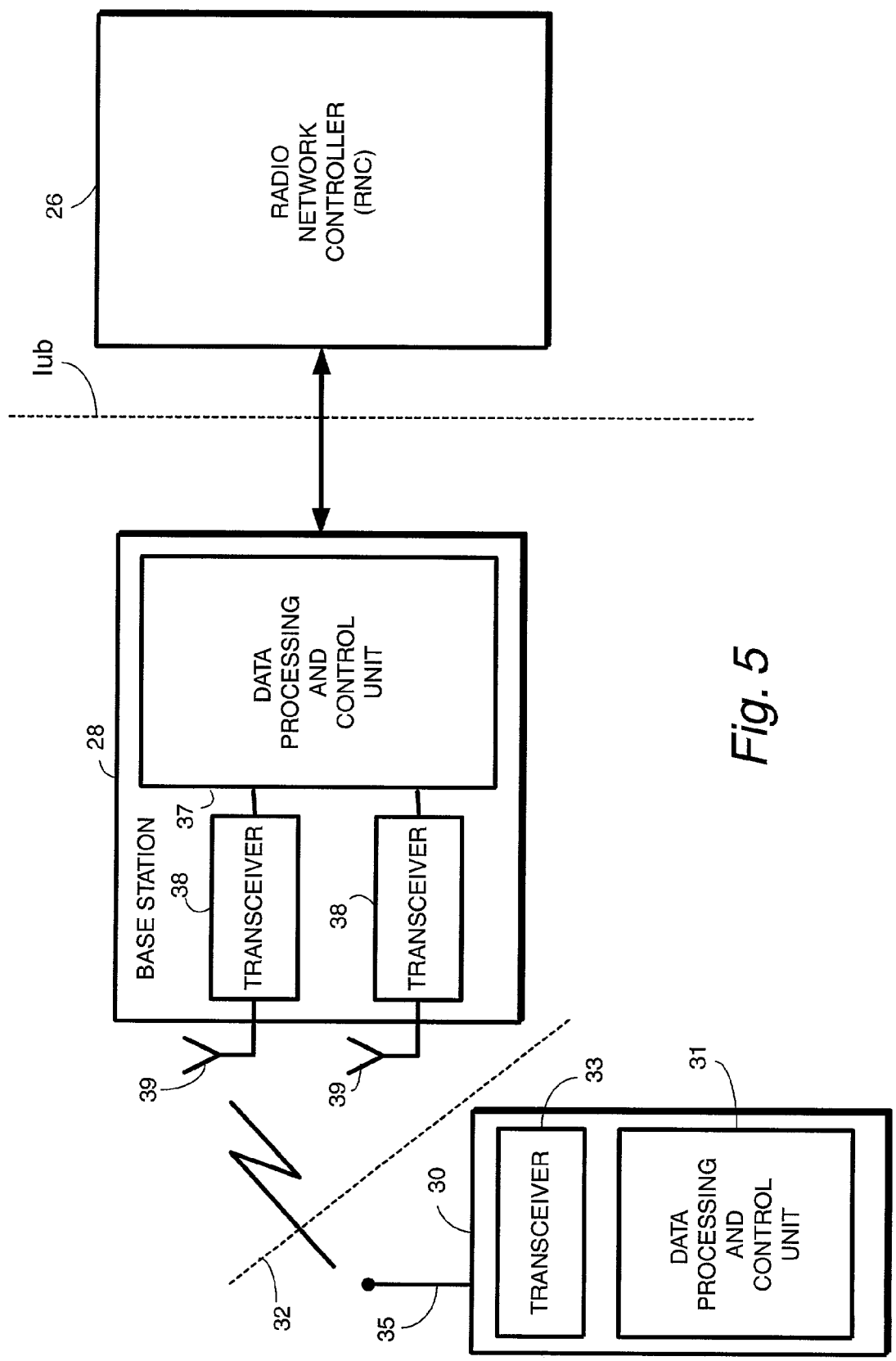
FIG. 5 is a simplified function block diagram of a portion of a UMTS Terrestrial Radio Access Network, including a user equipment unit (UE) station; a radio network controller; and a base station.

FIG. 5 shows selected general aspects of user equipment unit (UE) 30 and illustrative nodes such as radio network controller 26 and base station 28. The user equipment unit (UE) 30 shown in FIG. 5 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 5 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

Figure 6:
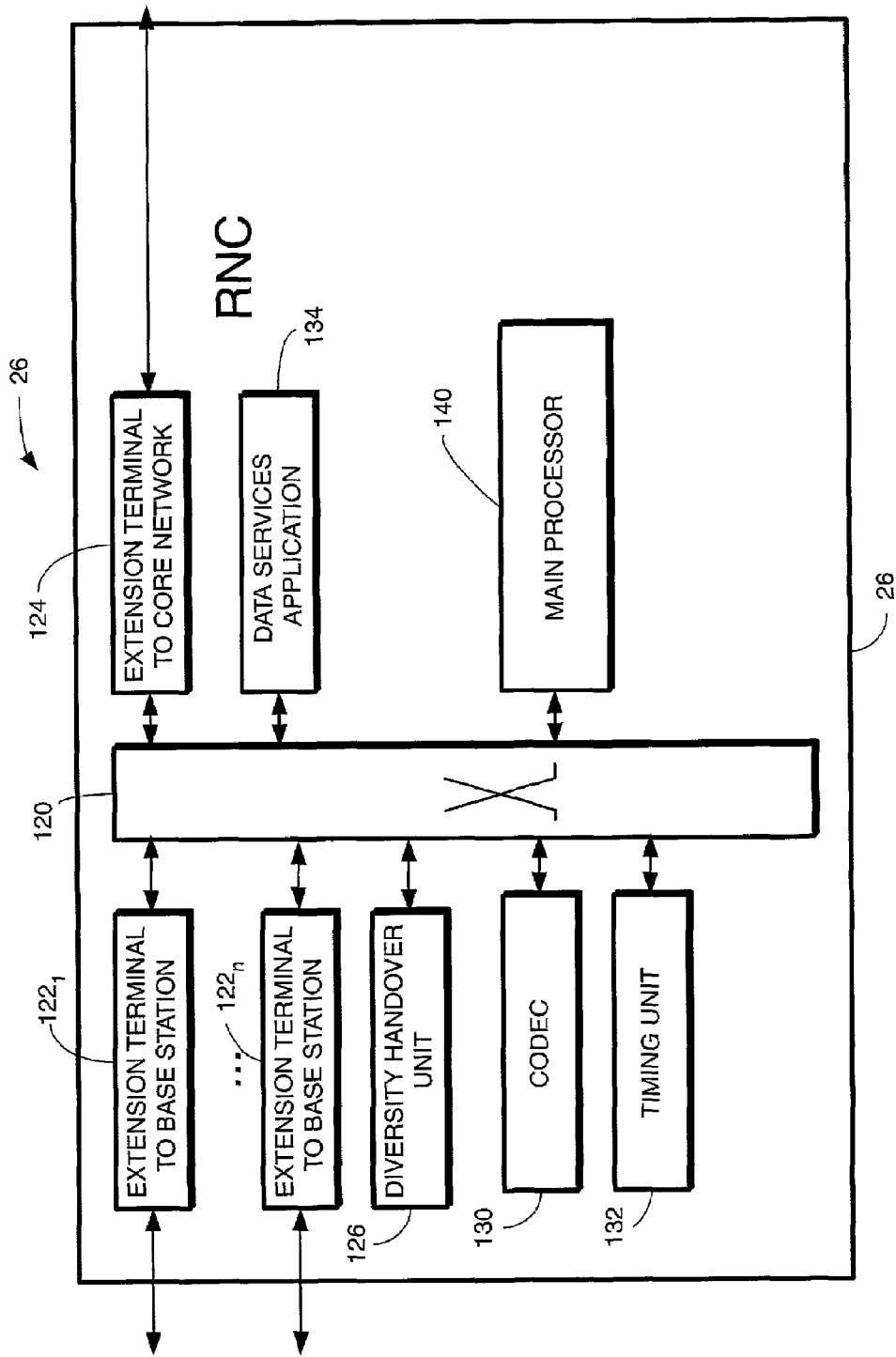
FIG. 6 is a schematic view of an example RNC node in accordance with one embodiment of the invention.

FIG. 6 illustrates, in somewhat more detail, an example non-limiting RNC node 26 of the present invention. It so happens that the RNC node 26 of FIG. 6 is a switched-based node having a switch 120. The switch 120 serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; codec 130; timing unit 132; a data services application unit 134; and, a main processor 140. The person skilled in the art will appreciate generally the functions of these constituent elements.

Figure 7:
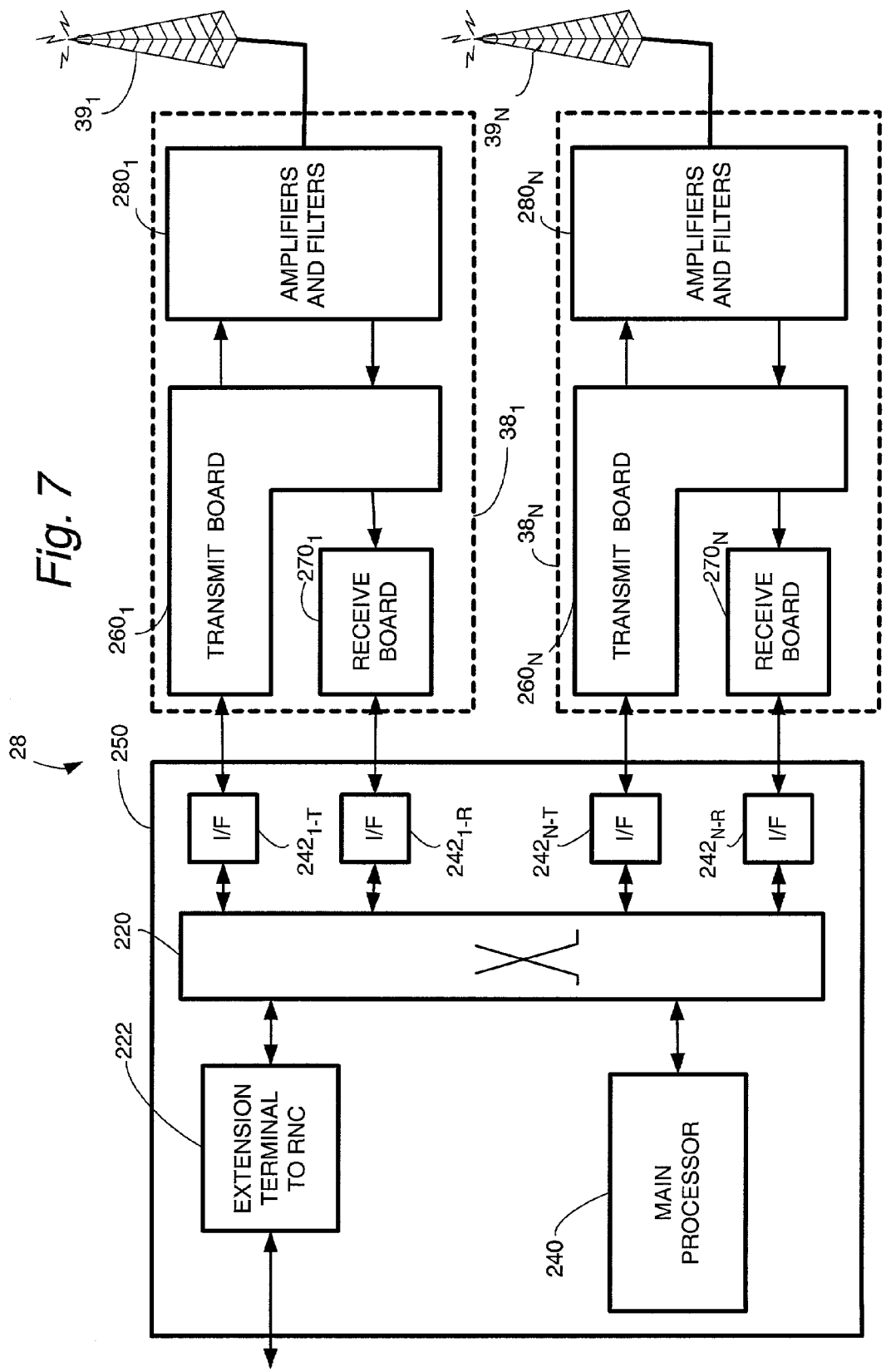
FIG. 7 is a schematic view of an example base station node in accordance with one embodiment of the invention.

FIG. 7 illustrates, in non-limiting manner, more details of an example base station (BS) node 28 in accordance with one embodiment of the present invention. As with RNC node 26, the base station (BS) node 28 of FIG. 7 is a switched-based node having a switch 220 which serves to interconnect other constituent elements of base station (BS) node 28. Such other constituent elements include extension terminal 222; BS main processor 240, and interface boards 242. Extension terminal 222 connects base station (BS) node 28 to radio network controller (RNC) node 26, and thus comprises the Iub interface.

The embodiment of base station (BS) node 28 illustrated in FIG. 7 is housed in a rack having multiple subracks. Each subrack has one or more boards, e.g., circuit boards, mounted thereon. A first subrack 250 contains boards for each of extension terminal 222; ALT unit 228; BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board $242_{1\text{-}T}$ is connected to transmitter board $260_1$, while interface board $242_{1\text{-}R}$ is connected to receiver board $270_1$. The pair of transmitter board $260_1$ and receiver board $270_1$ is, in turn, connected to amplifiers and filters board $280_1$. Similar connections exist for a second pairing of transmitter board $260_2$ and receiver board $270_2$, which interface via interface board $242_{2\text{-}T}$ and interface board $242_{2\text{-}R}$, respectively. Each transceiver 38 of FIG. 5 thus comprises a subrack which includes a transmitter board 260, a receiver board 270, and amplifiers and filters board 280. Each amplifiers and filters board 280 includes amplifiers, such as MCPA and LNA amplifiers.

In one example embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver sources which it shares with receiver board 270, including a radio frequency transmitter.

The receiver board 270 serves as one specific example of employment of techniques of the present invention. FIG. 8 shows in more detail certain example basic structure of one type of example receiver board 270. The receiver board 270 includes a radio frequency (RF) section 810, an intermediate frequency (IF) section 812, an analog-to-digital converter (ADC) 814; a digital filter section 816; and an equalizer 818. Each of these sections or elements are considered "modules" in terms of the present invention.

As generally understood by those skilled in the art, the radio frequency (RF) section 810 serves to down convert signals from radio frequency to intermediate frequency. The intermediate frequency (IF) section 812 serves to convert signals from intermediate frequency to baseband. The equalizer 818, which can employ an algorithm, equalizes a propagation channel.

In one example embodiment, the radio frequency (RF) section 810, intermediate frequency (IF) section 812, and analog-to-digital converter (ADC) 814 are realized or implemented in hardware. The digital filter section 816 can be implemented in hardware, software, or firmware. The equalizer 818 is typically implemented in software (although it could also, to some extent, be implemented in hardware).

The performance of the receiver of FIG. 8 depends on the hardware, the digital filter section 816, and the equalizer 818. In order to obtain the best performance, the digital filter section 816 needs to be customized to the hardware and equalizer 818. Reconfiguration of the receiver (and thus the radio base station itself) by using a new version of a hardware module or a software module might also require a new filter, e.g., another version of digital filter section 816. Thus, a platform such as a radio base station is continuously undergoing revision (e.g., updating) for such reasons as cost reduction, performance increase, or other improvement reasons. In actuality, both hardware and software are modified frequently over the life of the platform.

Customers of mobile phone systems (e.g., operators) continuously purchase new hardware and software. This means that the new hardware has to work with and be compatible with the old software, and that any new software must work with and be compatible with the old hardware. As understood from the foregoing, the present invention, in the context of the example radio base station of FIG. 8, solves a problem of selecting a proper filter parameter depending on a combination of hardware and software modules employed at the radio base station.

Referring to the example of FIG. 8 in context of a radio base station, FIG. 9 illustrates a parameter array or matrix 911 of parameter candidate values. In the example of FIG. 8 and FIG. 9, the parameter which is the subject of the parameter matrix 911 is a filter parameter. That is, the filter parameter is an example multi-module dependent parameter utilized in a radio base station node. The filter parameter can be, e.g., a filter parameter which either: (1) identifies which of plural filters are to be utilized; or (2) includes numbers to be utilized with or by a particular filter.

In the particular example of the parameter array or matrix 911A of FIG. 9A, the filter parameter is a number which informs the software which filter is to be utilized. For example, if at the radio base station version D of the hardware is being utilized in conjunction with version C of the software, Filter 4 is indicated (being located at the intersection of the "D" column and "C" row of parameter array or matrix 911A).

Alternatively, the values in parameter array or matrix could be parameters used in a filtering algorithm. For example, a common type of digital filter employed in digital filter section 816 is a Finite Impulse Response (FIR) filter. As understood by those skilled in the art, a Finite Impulse Response (FIR) filter uses the impulse response of the desired filter shape as input parameters. The impulse response is a vector of numbers. FIG. 9B accordingly illustrates an example of parameter array or matrix 911B storing a digital filter setting (impulse response vector) as a parameter.

Of course, the revised parameter array which accompanies an revised module can be an abbreviated revised parameter array such as in the manner previously illustrated and described with respect to FIG. 3. In this regard, FIG. 10 shows that parameter array or matrix 911A of FIG. 9A, after reconfiguration, can result in the revised parameter array $911A_{HARDWARE}$ when distributed with the last version (Revision E) a hardware module, or in the revised parameter array $911A_{SOFTWARE}$ when distributed with the last version (Revision D) a software module.

The present invention thus provides a technique for selecting a value (e.g., an optimum value) for a multi-module dependent parameter from among parameter candidate values at a platform wherein plural modules are employed. As stated above, the present invention is not limited to interaction between hardware and software modules, but can also apply to combinations of software modules when the multi-module dependent parameter depends on the version number or identities of plural software modules. For example, in a software/software context the multi-module dependent parameter could specify how the software modules are to communicate with one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of reconfiguring a telecommunications platform having both a first module and a second module, the method comprising:
   replacing at least a portion of an old version of the first module of the platform with a new version of the first module;
   providing along with the new version of the first module, an array of values for a parameter, an appropriate one of the values for the parameter being required in conjunction with execution of at least one of the first module and the second module, the array including, for each of plural potential versions of the second module, a parameter candidate value for use as the appropriate parameter value dependent upon a combined implementation at the platform of (1) the new version of the first module; and (2) a corresponding one of the potential versions of the second module.

2. The method of claim 1, further comprising determining which of the parameter candidate values in the array qualifies for the appropriate parameter to be utilized in conjunction with execution of the at least one of the first module and the second module.

3. The method of claim 1, further comprising including the array in the new version of the first module.

4. The method of claim 1, wherein one of the first module and the second module is a hardware module and another of the first module and the second module is a software module.

5. The method of claim 1, wherein the telecommunications platform is a node of a radio access network.

6. The method of claim 1, wherein the telecommunications platform is a base station node.

7. The method of claim 1, wherein the parameter is a filter parameter.

8. A method of reconfiguring a telecommunications platform having both a first module and a second module the method comprising:
- replacing at least a portion of an old version of the first module of the platform with a new version of the first module;
- providing along with the new version of the first module, an array of values for a parameter, an appropriate one of the values for the parameter being required in conjunction with execution of at least one of the first module and the second module, the array including, for each of plural potential versions of the second module, a parameter candidate value for use as the appropriate parameter value dependent upon a combined implementation at the platform of (1) the new version of the first module; and (2) a corresponding one of the potential versions of the second module
- wherein the array is a matrix having a first dimension and a second dimension, the first dimension being conceptualized as having one or more rows and the second dimension being conceptualized as having one or more columns, there being at least two rows or two columns, with one of the first dimension and the second dimension corresponding to one or more versions of the first module and another of the first dimension and the second dimension corresponding to one or more versions of the second module, each matrix position formed at the intersection of a column and row having a corresponding parameter candidate value.

9. A method of reconfiguring a telecommunications platform having both a first module and a second module, the method comprising:
- replacing at least a portion of an old version of the first module of the platform with a new version of the first module;
- providing along with the new version of the first module, an array of values for a parameter, an appropriate one of the values for the parameter being required in conjunction with execution of at least one of the first module and the second module, the array including, for each of plural potential versions of the second module, a parameter candidate value for use as the appropriate parameter value dependent upon a combined implementation at the platform of (1) the new version of the first module; and (2) a corresponding one of the potential versions of the second module;
- wherein the parameter is a filter parameter;
- wherein the filter parameter either; (1) identifies which of plural filters are be utilized; or (2) includes numbers to be utilized with or by a particular filter.

10. A method of reconfiguring a telecommunications platform having both a first module and a second module, the method comprising:
- maintaining a pre-revision parameter array for the first module, the pre-revision parameter array for the first module comprising a first set of parameter candidate values for plural combinations of versions of the first module and versions of the second module;
- maintaining a pre-revision parameter array for the second module, the pre-revision parameter array for the second module comprising a second set of parameter candidate values for plural combinations of versions of the first module and versions of the second module;
- determining, from one of the first set of parameter candidate values and the second set of parameter values, an appropriate parameter value for use in conjunction with execution of at least one of the first module and the second module;
- replacing at least a portion of a revised module with new version of the revised module, the revised module being one of the first module and the second module;
- providing along with the new version of the revised module, a revised parameter array for the revised module, the revised parameter array comprising a third set of parameter candidate values for plural version combinations of the first module and the second module;
- determining which of the parameter candidate values in the third set of parameter candidate values qualifies as an appropriate parameter value for use in conjunction with the execution of at least one of the modules of the platform.

11. The method of claim 10, further comprising including the revised parameter array in the new version of the revised module.

12. The method of claim 10, wherein the revised parameter array is a matrix having a first dimension and a second dimension, the first dimension being conceptualized as having one or more rows and the second dimension being conceptualized as having one or more columns, there being at least two rows or two columns, with one of the first dimension and the second dimension corresponding to one or more versions of the first module and another of the first dimension and the second dimension corresponding to one or more versions of the second module, each matrix position formed at the intersection of a column and row having a corresponding parameter candidate value.

13. The method of claim 10, wherein one of the first module and the second module is a hardware module and another of the first module and the second module is a software module.

14. The method of claim 10, wherein the telecommunications platform is a node of a radio access network.

15. The method of claim 10, wherein the telecommunications platform is a base station node.

16. The method of claim 15, wherein the parameter is a filter parameter.

17. The method of claim 16, wherein the filter parameter either; (1) identifies which of plural filters are to be utilized; or (2) includes numbers to be utilized with or by a particular filter.

18. A telecommunications platform comprising:
- a new version of a first module;
- a second module;
- an array of values for a parameter, an appropriate one of the values for the parameter being required in conjunction with execution of at least one of the first module and the second module, the array including, for each of plural potential versions of the second module, a parameter candidate value for use as the appropriate parameter value dependent upon a combined implementation at the platform of (1) the new version of the first module; and (2) a corresponding one of the potential versions of the second module.

19. The apparatus of claim 18, wherein the at least one of the first module and the second module determines which of the parameter candidate values in the array qualifies for the appropriate parameter to be utilized conjunction with execution of the at least one of the first module and the second module.

20. The apparatus of claim 18, wherein the array is included in the new version of the first module.

21. The apparatus of claim 18, wherein one of the first module and the second module is a hardware module and another of the first module and the second module is a software module.

22. The apparatus of claim 18, wherein the telecommunications platform is a node of a radio access network.

23. The apparatus of claim 18, wherein the telecommunications platform is a base station node.

24. The method of claim 23, wherein the parameter is a filter parameter.

25. A telecommunications platform comprising:
a new version of a first module;
a second module;
an array of values for a parameter, an appropriate one of the values for the parameter being required in conjunction with execution of a least one of the first module and the second module, the array including, for each of plural potential versions of the second module, a parameter candidate value for use as the appropriate parameter value dependent upon a combined implementation at the platform of (1) the new version of the first module; and (2) a corresponding one of the potential versions of the second module;
wherein the array is a matrix having a first dimension and a second dimension, the first dimension being conceptualized as having one or more rows and the second dimension being conceptualized as having one or more columns, there being at least two rows or two columns, with one of first dimension and the second dimension corresponding to one or more versions of the first module and another of the first dimension and the second dimension corresponding to one or more versions of the second module, each matrix position formed at the intersection of a column and row having a corresponding parameter candidate value.

26. A telecommunications platform comprising:
a new version of a first module;
a second module;
an array of values for a parameter, an appropriate one of the values for the parameter being required in conjunction with execution of at least one of the first module and the second module, the array including, for each of plural potential versions of the second module, a parameter candidate value for use as the appropriate parameter value dependent upon a combined implementation at the platform of (1) the new version of the first module; and (2) a corresponding one of the potential versions of the second module;
wherein the parameter is a filter parameter;
wherein the filter parameter either; (1) identifies which of plural filters are to be utilized; or (2) includes numbers to be utilized with or by a particular filter.

* * * * *